(12) United States Patent
Itahana

(10) Patent No.: US 8,745,509 B2
(45) Date of Patent: Jun. 3, 2014

(54) IMAGE DISPLAY SYSTEM, GRAPHICAL USER INTERFACE, AND IMAGE DISPLAY METHOD

(75) Inventor: Kyosuke Itahana, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 506 days.

(21) Appl. No.: 13/042,779

(22) Filed: Mar. 8, 2011

(65) Prior Publication Data

US 2011/0231791 A1 Sep. 22, 2011

(30) Foreign Application Priority Data

Mar. 19, 2010 (JP) ................................ 2010-063467

(51) Int. Cl.
*G06F 3/00* (2006.01)
*G06F 3/048* (2006.01)
*G06F 3/14* (2006.01)
*G06F 3/0481* (2013.01)

(52) U.S. Cl.
CPC ............ *G06F 3/1423* (2013.01); *G06F 3/0481* (2013.01)
USPC ........... 715/761; 715/764; 715/765; 715/778; 715/804; 345/619; 345/660; 345/690

(58) Field of Classification Search
CPC .............................. G06F 3/1423; G06F 3/0481
USPC ................. 715/750–765, 778, 798, 799, 781; 345/619, 660, 690
See application file for complete search history.

(56) References Cited

U.S. PATENT DOCUMENTS

| | | | |
|---|---|---|---|
| 5,995,096 A * | 11/1999 | Kitahara et al. | 715/753 |
| 6,002,995 A | 12/1999 | Suzuki et al. | |
| 6,535,226 B1 * | 3/2003 | Sorokin et al. | 715/723 |
| 7,007,235 B1 * | 2/2006 | Hussein et al. | 715/751 |
| 7,180,511 B2 | 2/2007 | Shigeta | |
| 2002/0138584 A1 * | 9/2002 | Fujimoto et al. | 709/206 |
| 2007/0257927 A1 | 11/2007 | Sakanishi et al. | |
| 2009/0044116 A1 | 2/2009 | Kitabayashi | |
| 2009/0287832 A1 * | 11/2009 | Liang et al. | 709/228 |
| 2010/0007796 A1 * | 1/2010 | Yamaji et al. | 348/588 |
| 2010/0017745 A1 | 1/2010 | Kikuchi et al. | |
| 2011/0161836 A1 * | 6/2011 | Mu et al. | 715/756 |
| 2011/0187664 A1 * | 8/2011 | Rinehart | 345/173 |

FOREIGN PATENT DOCUMENTS

| | | |
|---|---|---|
| JP | A-9-271021 | 10/1997 |
| JP | A-2000-187545 | 7/2000 |
| JP | A-2001-356753 | 12/2001 |
| JP | A-2009-042912 | 2/2009 |
| JP | A-2010-026053 | 2/2010 |
| WO | WO 2005/088602 A1 | 9/2005 |

* cited by examiner

*Primary Examiner* — Tadeese Hailu
(74) *Attorney, Agent, or Firm* — Oliff PLC

(57) ABSTRACT

An image display system includes: a plurality of image supply devices; and an image display device adapted to display one or more supply images out of supply images supplied from the respective image supply devices, wherein each of the image supply devices includes a display section, and an interface section adapted to display an operating image on the display section, the operating image being used for selecting at least one of the supply images to be displayed by the image display device and designating a layout of the images, and to transmit an instruction by a user via the operating image to the image supply devices.

17 Claims, 10 Drawing Sheets

IMAGE DISPLAY SYSTEM, GRAPHICAL USER INTERFACE, AND IMAGE DISPLAY METHOD

CROSS-REFERENCE

The entire disclosure of Japanese Patent Application No. 2010-063467 filed Mar. 19, 2010 is expressly incorporated by reference herein.

BACKGROUND

1. Technical Field

The present invention relates to an image display system.

2. Related Art

There has been known a image display system, which is supplied with image signals from a plurality of signal supply sources, and then displays the images (hereinafter referred to as "supply images") represented by the respective image signals thus supplied on a single image display section in a split layout (e.g., JP-A-2001-356753 and JP-A-9-271021). Such an image display system is used at, for example, a conference or a presentation in order for making the participants view the display screens of the personal computers used by the respective participants on the display screen common to the participants.

Here, in such an image display system as described above, it is preferable that the supply images to be the display object can be selected from the supply images from the plurality of image signal supply sources, and the split layout thereof can arbitrarily be changed in accordance with the number of the supply images to be the display object. Further, the operation for selecting the supply images to be the display object and the operation for changing the split layout frame described above are preferably easy operations with a higher usability. However, in actual situations, sufficient devices have not ever been made with respect to such a demand.

SUMMARY

An advantage of some aspects of the invention is to provide the technology for improving the operability of the image display system.

According to an aspect of the invention, there is provided an image display system including a plurality of image supply devices, and an image display device adapted to display one or more supply images out of supply images supplied from the respective image supply devices, wherein each of the image supply devices includes a display section, and an interface section adapted to display an operating image on the display section, the operating image being used for selecting at least one of the supply images to be displayed by the image display device and designating a layout of the supply images selected, and to transmit an instruction by a user via the operating image to the image supply devices, and the interface section displays the operating image on the display section, the operating image including a candidate image display area adapted to arrange and display identification images representing candidate images to be display candidates out of the supply images, and a selection frame used for selecting and arranging at least one of the candidate images to be actually displayed by the image display device out of one or more of the identification images displayed in the candidate image display area, and displays the selection frame so as to take either one of two or more display patterns set previously and different from each other in one of a display position in the candidate image display area and a number of candidate images included in the selection frame, and to change from one display pattern to another display pattern out of the two or more display patterns in accordance with an operation by the user.

According to the image display system of this aspect of the invention, the user is allowed to change the display pattern of the selection frame by a user operation, and due to this change, it becomes possible to change the supply image to be the display object, or to designate the layout of the supply images. Therefore, the operability for the user in the image display system is improved.

The image display system related to the above aspect of the invention may be configured such that the drag operation includes a first operation performed while designating an image area in the selection frame with a pointer, and a second operation performed while designating a position on the selection frame, and the interface section changes the selection frame to the display pattern with a different display position when receiving the first operation, and changes the selection frame to the display pattern with the different number of candidate images included in the selection frame when receiving the second operation.

According to this configuration of the invention, the user can perform the operation of the selection frame by the intuitively operation of the designation with the pointer. Therefore, the operability for the user in the image display system is improved.

The image display system related to the above aspect of the invention may be configured such that the number of the identification images displayed in the candidate image display area is equal to the number of the supply images, which can be arranged in the display image by the image display device.

According to the image display system of this configuration of the invention, even in the case in which the number of supply images supplied from the image supply devices to the image display device is larger than the number of supply images, which can be arranged in the display image, the user can visually recognize the supply image, which can be the projection object. Therefore, the convenience of the user in the image display system is enhanced.

The image display system related to the above aspect of the invention may be configured such that a part of the candidate image display area where no identification image is disposed is indicated in a visible manner.

According to the image display system of this configuration of the invention, the user can easily recognize the fact that it is possible to add the candidate image, which can be displayed on the image display device. Therefore, the convenience of the user in the image display system is enhanced.

The image display system related to the above aspect of the invention may be configured such that the image display device includes an interface section adapted to make the display section of each of the image supply devices display an operating image, the operating image being used for selecting at least one of the supply images to be displayed and designating a layout of the supply images selected, and to receive the instruction by a user via the operating image from the image supply devices, and the interface section makes the display section display the operating image including the candidate image display area adapted to arrange and display identification images representing the candidate images to be the display candidates out of the supply images, and the selection frame used for selecting and arranging at least one of the candidate images to be actually displayed by the image display device out of the one or more of the identification images displayed in the candidate image display area, and displays the selection frame so as to take either one of two or more display patterns set previously and different from each other in one of a display position in the candidate image display area and a number of candidate images included in the selection frame, and to change from one display pattern to another display pattern out of the two or more display patterns in accordance with an operation by the user.

According to the image display system of this configuration of the invention, it is possible to reflect the fact that the state of the operating image is changed due to the instruction from one of the number of image supply devices to the display section of another image supply device via the interface section of the image display device. Therefore, the convenience of the user in the image display system is enhanced.

According to another aspect of the invention, there is provided a graphical user interface to be displayed on a display section of each of image supply devices in order for selecting one or more supply images out of the supply images supplied from the respective image supply devices, and displaying the selected supply image on an image display device, including a candidate image display area adapted to arrange and display identification images representing the respective candidate images to be display candidates out of the supply images, and a selection frame used for selecting and arranging at least one of the candidate images actually displayed by the image display device out of one or more of the identification images displayed in the candidate image display area, wherein the selection frame takes either one of two or more display patterns set previously and different from each other in one of a display position in the candidate image display area and a number of candidate images included in the selection frame, and changes from one display pattern to another display pattern out of the two or more display patterns in accordance with an operation by the user.

According to still another aspect of the invention, there is provided an image display method in an image display system, including the steps of (a) providing a plurality of image supply devices each having a display section, and an image display device adapted to display one or more supply images out of supply images supplied from the respective image supply devices, (b) displaying, in the image supply device, an operating image on the display section, the operating image being used for, selecting at least one of the supply images to be displayed by the image display device and designating a layout of the supply images selected, (c) arranging and displaying, in the image supply device, identification images representing candidate images to be display candidates out of the supply images in a candidate image display area previously provided in the operating image, and displaying a selection frame used for selecting and arranging at least one of the candidate images to be actually displayed by the image display device out of one or more of the identification images displayed in the candidate image display area, (d) displaying, in the image supply device, the selection frame so as to take either one of two or more display patterns set previously and different from each other in one of a display position in the candidate image display area and a number of candidate images included in the selection frame, and to change from one display pattern to another display pattern out of the two or more display patterns in accordance with an operation by the user, (e) transmitting, in the image supply device, an instruction by the user via the operating image to the image display device, and (f) displaying, in the image supply device, the supply images selected in the designated layout in response to the instruction by the user received.

It should be noted that the invention can be realized, in various forms, such as an image display system, an image display device for constituting the image display system, an image display method or a control method in the image display system, a computer program for realizing the function of the system, the device, or the method, or a recording medium or the like storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
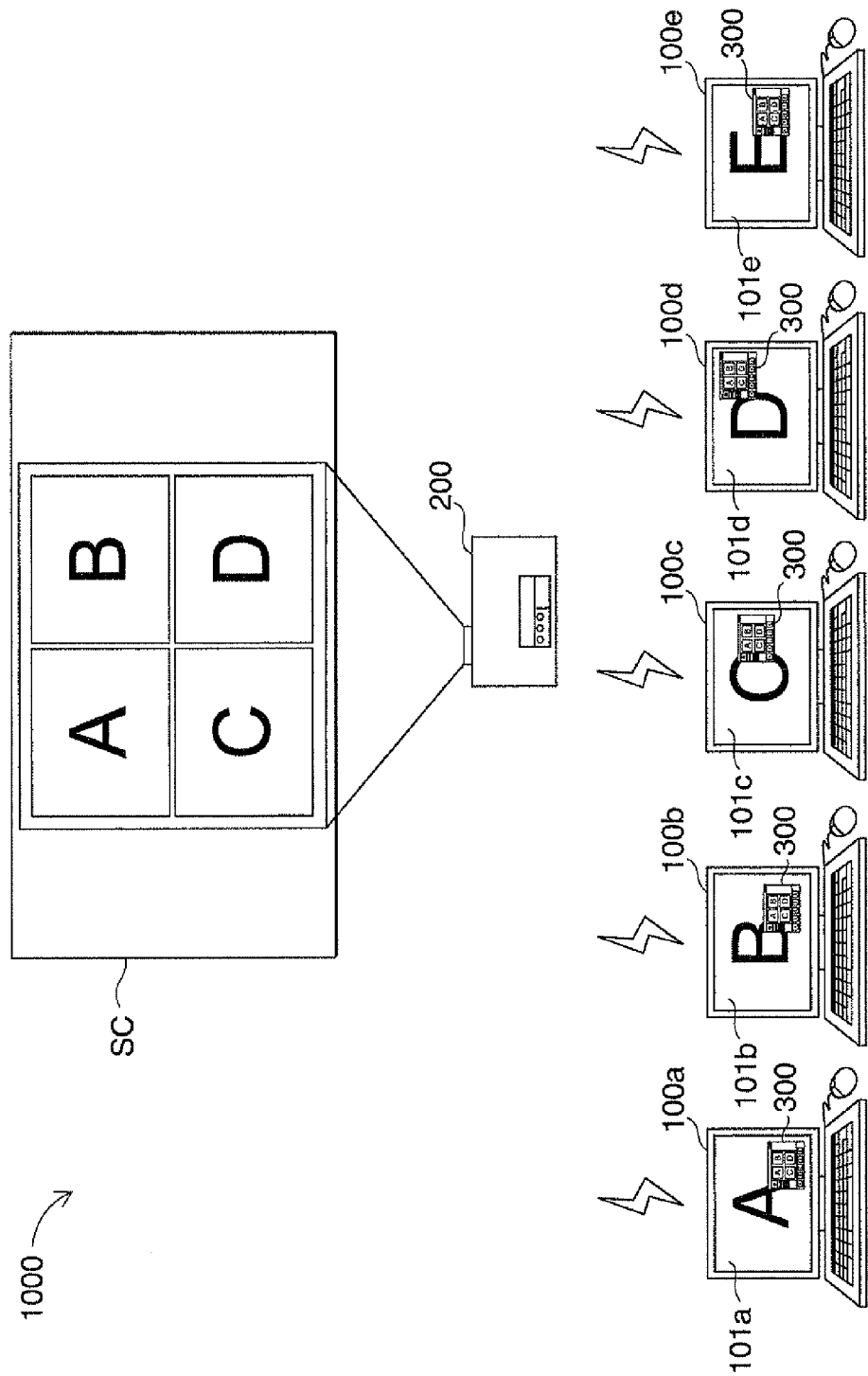
FIG. 1 is a schematic diagram showing a configuration of an image display system.

FIG. 1 is a schematic diagram showing a configuration of an image display system 1000 as an embodiment of the invention. The image display system 1000 is provided with five image supply devices 100a through 100e, an image display device 200, and a projection screen SC. The five image supply devices 100a through 100e each can be connected to the image display device 200 via a wireless LAN. Each of the image supply devices 100a through 100e establishes connection with the image display device 200, and then transmits an image signal representing a supply image, which is generated by capturing the display image the image supply device itself keeps displaying, to the image display device 200. The image display device 200 is capable of arranging the maximum of four supply images selected from the supply images supplied from the respective image supply devices 100a through 100e on the divisions of the projection screen SC and displaying them simultaneously.

It should be noted that in the present image display system 1000, an operation window 300 as an operating image for accepting operations by the user is displayed on each of the display images 101a through 101e of the respective image supply devices 100a through 100e. The users of the respective image supply devices 100a through 100e are allowed to execute the operations to the display image on the projection screen SC via the operation window 300.

Figure 2:
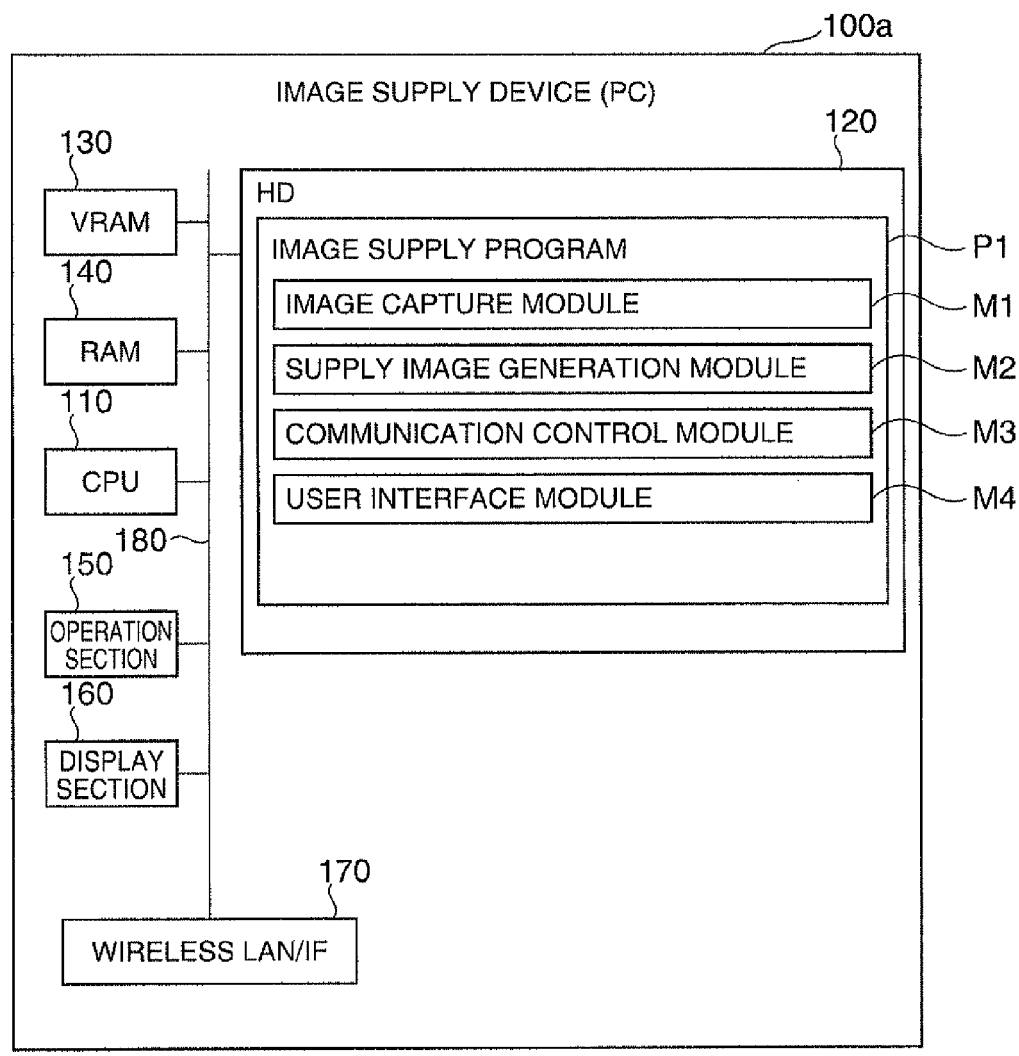
FIG. 2 is a block diagram showing an internal configuration of a first image supply device.

FIG. 2 is a block diagram showing an internal configuration of the first image supply device 100*a*. It should be noted that since the internal configurations of the other image supply devices, namely the second through fifth image supply devices 100*b* through 100*e* are substantially the same, the illustrations and the explanations thereof will be omitted. The first image supply device 100*a* can be configured with an information processing device such as a personal computer or a laptop computer loaded with Windows (registered trademark) as an operating system. Specifically, the first image supply device 100*a* is provided with a central processing unit (CPU) 110, a hard disk drive (HD) 120, a drawing memory (VRAM) 130, and a random access memory (RAM) 140. Further, the first image supply device 100*a* is further provided with an operation section 150, a display section 160, and a wireless LAN interface (wireless LAN/IF) 170. These constituents 110 through 170 are connected to each other via a bus 180.

The CPU 110, which is a logic circuit for executing various kinds of arithmetic processing, expands various programs and modules, which are stored in an external storage device such as the HD 120, on the RAM 140 as a primary storage device, and then executes them. The RAM 140 is a volatile memory, and temporarily stores operation results of the CPU 110, supply image data to be supplied to the image display device 200, and so on. The VRAM 130 is a memory for expanding and then temporarily buffering the data of the display image drawn based on the data, and is generally capable of reading and writing the data faster than the RAM 140.

The operation section 150 is composed of, for example, a mouse, a keyboard, and a touch pad, and receives an operation of the user of the first image supply device 100*a*. The display section 160 is composed of, for example, a liquid crystal display, and displays images based on the contents stored in the VRAM 130. The wireless LAN/IF 170 is an interface for connecting the first image supply device 100*a* and an external device to each other in a wireless manner. The first image supply device 100*a* performs exchange of a signal with the image display device 200 via the wireless LAN/IF 170.

The HD 120 stores an image supply program P1. The image supply program P1 generates the supply image data to be supplied to the image display device 200 and transmits it thereto, and at the same time, provides the user with an interface for performing the operation of changing the display state of the projection screen SC. It should be noted that it is also possible to assume that the image supply program P1 has previously been installed in the image supply devices 100*a* through 100*e*, or to assume that it is retrieved from the image display device 200 into each of the image supply devices 100*a* through 100*e* upon connection to the image display device 200.

The image supply program P1 has an image capture module M1, a supply image generation module M2, a communication control module M3, and a user interface module M4. The image capture module M1 obtains (captures) the image data representing the image displayed on the display section 160 from the VRAM 130.

The supply image generation module M2 generates the supply image to be supplied to the image display device 200 using the image data obtained by the image capture module M1. It should be noted that the supply image generation module M2 can be arranged to generate the image, which is obtained by eliminating the operation window 300 (FIG. 1) from the image 101*a* presently displayed on the display section 160, as the supply image. Further, the supply image generation module M2 can be arranged to generate the image, which is obtained by trimming only the area having been previously selected by the user out of the image 101*a* displayed on the display section 160, as the supply image.

The communication control module M3 controls the wireless LAN/IF 170 to control communication with the image display device 200. Specifically, the communication control module M3 obtains the model information of the image display device 200, and then establishes the connection with the image display device 200. Here, "the model information of the image display device 200" includes, for example, identification information for identifying the image display device 200, and the information (e.g., the maximum resolution with which the image can be displayed, and a color profile) related to the image display characteristics of the image display device 200. Further, the communication control module M3 transmits the supply image data generated by the supply image generation module M2 to the image display device 200.

The user interface module M4 displays the operation window 300, which is the image for the user interface described above, on the display section 160, and receives instructions of the user via the operation window 300. The communication control module M3 transmits the instruction of the user, which has been received via the operation window 300 to the image display device 200. The specific contents of the operations the user is allowed to perform on the operation window 300 will be described later. Further, the user interface module M4 obtains update information (described later) of the operation window 300 transmitted from the image display device 200, and at the same time, updates the display content of the operation window 300.

Figure 3:
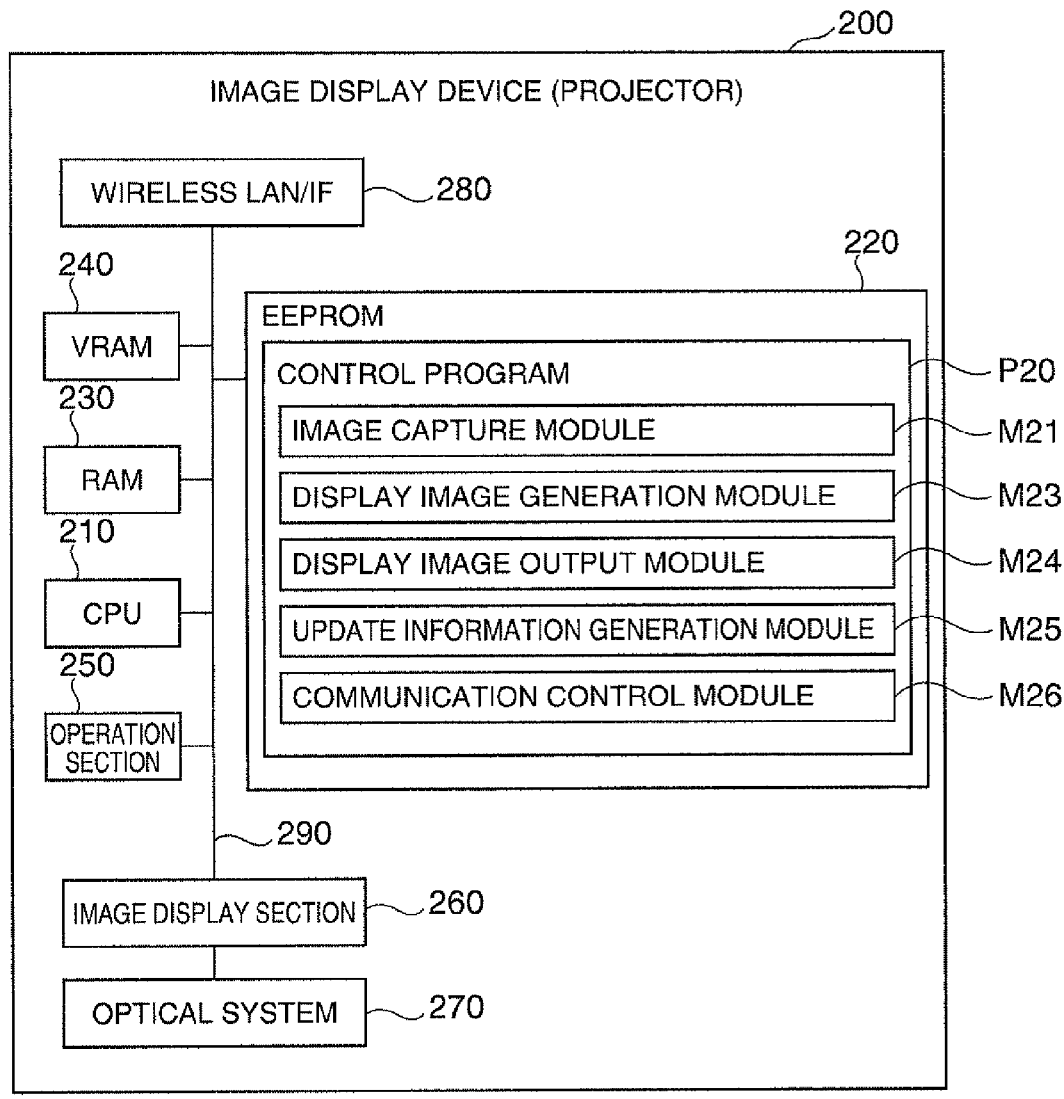
FIG. 3 is a block diagram showing an internal configuration of an image display device.

FIG. 3 is a block diagram showing an internal configuration of the image display device 200. The image display device 200 is composed of a projector. The image display device 200 is provided with a CPU 210, an EEPROM 220 as a nonvolatile memory, a RAM 230, a VRAM 240, an operation section 250, an image display section 260, an optical system 270, and a wireless LAN/IF 280. These constituents 210 through 280 are connected to each other via a bus 290.

The CPU 210, which is a logic circuit for executing various kinds of arithmetic processing, expands various programs and modules, which are stored in the EPROM 220, in the RAM 230, and then executes them. The RAM 230 temporarily stores a result of calculation by the CPU 210. The VRAM 240 is a memory device for temporarily buffering the drawing data (e.g., data of pixel values arranged by the bitmap method) generated based on the display image data. The operation section 250 is composed of an operation button, a touch panel, and so on, and receives various operations by the user related to the image display device 200 such as control of the display state including zooming and focusing of the projection image.

The image display section 260 modulates the light emitted from a light source based on the drawing data stored in the VRAM 240 using liquid crystal panels or digital micro mirror devices (DMD) to thereby generate an image for projection. The optical system 270 is composed of a plurality of lenses, and projects the image generated by the image display section 260 on the projection screen SC with the size and the focus thereof adjusted. The wireless LAN/IF 280 is an interface for connecting the image display device 200 and an external device to each other in a wireless manner. The image display device 200 executes exchange of the signals with each of the image supply devices 100*a* through 100*e* via the wireless LAN/IF 280.

The EEPROM 220 stores a control program. P20 for controlling the image display device 200. The control program P20 has an image capture module M21, a display image generation module M23, a display image output module M24, an update information generation module M25, and a communication control module M26. The image capture module M21 obtains the supply image supplied from each of the image supply devices 100a through 100e in cooperation with the communication control module M26. The display image generation module M23 generates the image (the display image) for projection obtained by arranging the supply images obtained from the respective image supply devices 100a through 100e in accordance with the instruction of the user.

Here, in the image display device 200, the patterns of the layout of the supply images in the display image have previously been set as a plurality of layout modes. The display image generation module M23 generates the display image data in accordance with the layout mode selected by the user. Specifically, there are provided a single image layout mode, a dual split layout mode, and a quad split layout mode. "The single image layout mode" denotes the layout mode in which one supply image alone can be arranged, and "the dual split layout mode" denotes the layout mode in which two supply images can be arranged in parallel to each other.

Further, "the quad layout mode" denotes the layout mode in which four supply images can be arranged in a 2×2 matrix.

The display image output module M24 generates the drawing data based on the image data representing the display image, and then stores it into the VRAM 240. The update information generation module M25 generates the update information for updating the display contents of the operation window 300 based on the operation contents by the user on the operation window 300 transmitted to the image display device 200. The update information is arbitrarily delivered to each of the image supply devices 100a through 100e connected to the image display device 200. Specifically, in the image display system 1000 synchronization of the display contents of the operation window 300 between the image supply devices 100a through 100e is performed due to the generation and delivery of the update information.

The communication control module M26 controls the wireless LAN/IF 280 to control communication with each of the image display devices 100a through 100e. Specifically, the communication control module M26 executes a process for establishing a communication channel for, for example, transmission of the model information, reception of the supply images, acquisition of the information regarding the user in each of the image supply devices 100a through 100e, delivery of the update information, and so on.

Figure 4A:
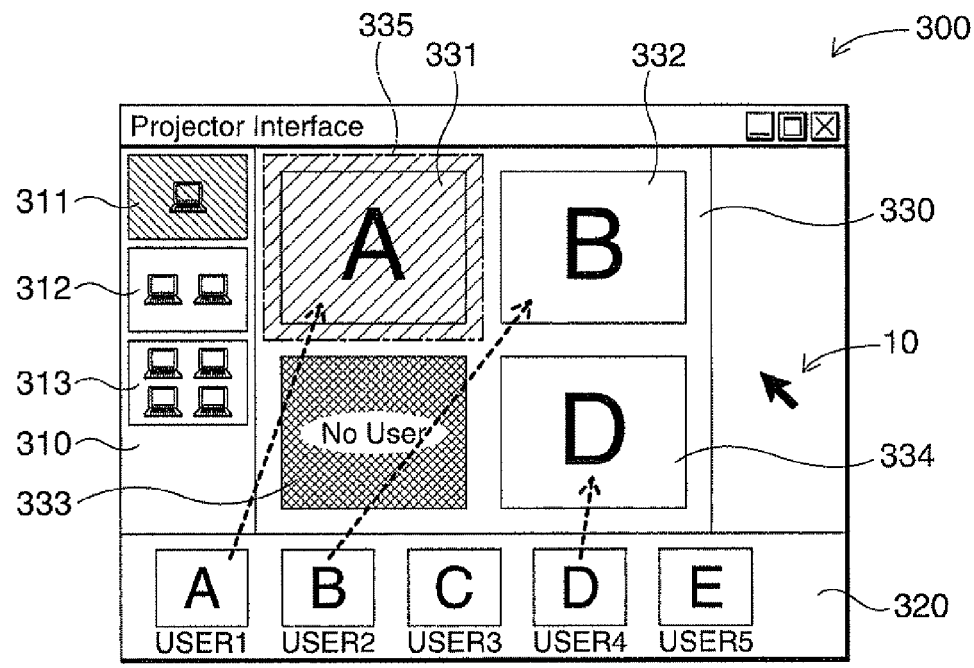
FIG. 4A is a schematic diagram showing an operation window.

FIG. 4A is a schematic diagram showing the operation window 300 displayed in each of the image supply devices 100a through 100e. The operation window 300 can be operated using a pointer 10 displayed on the display section 160 of each of the image supply devices 100a through 100e. The user of each of the image supply devices 100a through 100e can select the supply image displayed on the projection screen SC or change the layout mode in the display image of the projection screen SC by operating the operation window 300.

The operation window 300 includes a layout mode display area 310, a login user list area 320, and a display candidate image list area 330. Specifically, the layout mode display area 310 and the display candidate image list area 330 are disposed right and left in parallel to each other in the display area above the login user list area 320, and the login user list area 320 is disposed in the lowermost display area of the operation window 300.

The layout mode display area 310 is a display area for making the user view the layout mode selected presently. As described above, the image display system 1000 has three layout modes. In the layout mode display area 310, there are displayed icon images 311 through 313 corresponding respectively to these three layout modes. Specifically, in the layout mode display area 310, there are displayed a first icon image 311 representing the single image layout mode, a second icon image 312 representing the dual split layout mode, and a third icon image 313 representing the quad split layout mode.

In the layout mode display area 310, one corresponding to the layout mode selected presently out of these icon images 311 through 313 is displayed with a modified display condition such as a modified display color. In FIG. 4A, the first icon image 311 is provided with hatching to thereby show the condition as an example in which the single image layout mode is selected.

The login user list area 320 is a display area for displaying the users, who presently log on the image display device 200 via the respective image supply devices 100a through 100e as a list. The information (also referred to as "user identification information") for making it possible to identify the user having logged on the image display device 200 is additionally displayed in the login user list area 320 every time the user logs on the image display device 200 via any one of the image supply devices 100a through 100e. FIG. 4A shows the condition in which five users log on the image display device 200 via the image supply devices 100a through 100e as an example.

Here, the user identification information includes, for example, a user name and an icon image having previously set for each user. The user identification information is obtained by the communication control module M26 (FIG. 3) of the image display device 200 in the exchange when establishing the connection between the image display device 200 and each of the image supply devices 100a through 100e. Further, the user identification information is delivered to each of the image supply devices 100a through 100e as the update information for the operation window 300 every time the login/logout to the image display device 200 occurs.

In the present embodiment, the user names (shown in the drawing as "USER1" through "USER5") are displayed in the login user list area 320 as the user identification information, and at the same time, the thumbnail images representing the supply images are displayed so as to correspond to the respective user names. These thumbnail images are made by shrinking the supply images from the respective image supply devices 100a through 100e. In other words, in the present embodiment, the login user list area 320 also functions as the image area for the users to read through all of the supply images supplied to the image display device 200. Further, it is also possible to recognize that the user identification information is identification information for identify the supply images having supplied to the image display device 200.

It should be noted that these thumbnail images are generated by the update information generation module M25 (FIG. 3) of the image display device 200. Further, the thumbnail images are delivered at regular intervals by the communication control module M26 to all of the image supply devices 100a through 100e connected thereto as the update information of the operation window 300.

Incidentally, as described above, the image display system 1000 according to the present embodiment is capable of displaying the maximum of four supply images on the projection screen SC with a split layout. However, in some cases, the image display device 200 is supplied with more than four supply images (FIG. 4A). Therefore, in the image display system 1000, it is possible to previously register the maximum of four supply images out of all of the supply images supplied to the image display device 200 as the display candidate images to be displayed by projection on the projection screen SC. Further, in the image display system 1000, each of the users logging on the image display device 200 can perform the registration operation of such display candidate images using the display candidate image list area 330 of the operation window 300. Further, in the image display system 1000, the operation of selecting the image to be actually projected on the projection screen SC from the display candidate images thus registered using the display candidate image list area 330 is possible, and the operation of selecting the layout mode in the case of projection is also possible.

The display candidate image list area 330 has first through fourth thumbnail image area 331 through 334 having a 2×2 matrix layout configuration. Specifically, the first and second thumbnail image areas 331, 332 are disposed in the upper column of the display candidate image list area 330 so as to be arranged in parallel in the lateral direction of the screen. Further, the third and fourth thumbnail image areas 333, 334 are disposed in the lower column of the display candidate image list area 330 so as to be arranged in parallel in the lateral direction of the screen. It should be noted that the layout configuration of these four thumbnail image areas 331 through 334 in the display candidate image list area 330 corresponds to the split layout frame of the display image in the quad split layout mode.

Each of the users can perform the registration of the display candidate images by the following operation. Specifically, using the pointer 10, the user drags and drops the thumbnail images as the registration object out of the thumbnail images displayed on the login user list area 320 into either one of the four thumbnail image areas 331 through 334 described above. Thus, the supply image represented by the thumbnail image thus dragged and dropped is registered as the display candidate image. It should be noted that in the display candidate image list area 330, the thumbnail image of the supply image thus registered as the display candidate image is displayed in the thumbnail image area where the thumbnail image is dropped. In other words, the display candidate image list area 330 functions as the display area for displaying the supply image registered as the display candidate image so that the user can read through the supply image registered.

FIG. 4A schematically shows the condition in which three thumbnail images are dragged and dropped into the display candidate image list area 330 to thereby be registered as the display candidates as an example of the registration operation. Specifically, the thumbnail images of the three supply images supplied respectively from the first and second image supply devices 100a, 100b, and further the third image supply device 100c are displayed in the three thumbnail image areas 331, 332, and 334 of the display candidate image list area 330. Here, in the present example, since no display candidate image is assigned to the third thumbnail image area 333, the message of "No User" indicating that interest is displayed in the third thumbnail image area 333.

It should be noted that in the operation window 300, if the thumbnail image displayed in the display candidate image list area 330 is dragged and dropped to the outside, the registration of the display candidate image with respect to the supply image represented by that thumbnail image is eliminated. Further, if the thumbnail image of the login user list area 320 is dragged and dropped so as to overlap the thumbnail image displayed in the display candidate image list area 330, the registration of the display candidate image is replaced.

Here, in the display candidate image list area 330, there is further displayed an image selection frame 335 for selecting the image to be displayed by projection on the projection screen SC from the display candidate images. In FIG. 4A, the image selection frame 335 is indicated by the dashed dotted lines, and the area surrounded by the image selection frame 335 is provided with hatching. In the image display system 1000, the supply image represented by the thumbnail image included in the area surrounded by the image selection frame 335 is displayed on the projection screen SC.

Figure 4B:
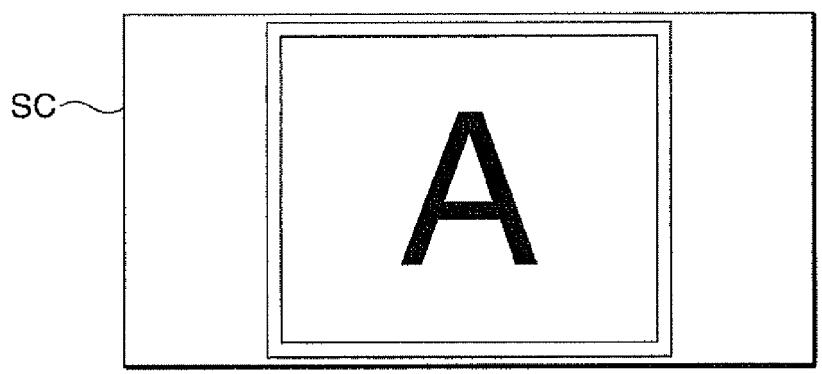
FIG. 4B is a schematic diagram showing the display state of a projection image on a projection screen.

In FIG. 4A, there is shown a condition as an example in which the image selection frame 335 is displayed on the first thumbnail image area 331, and therefore, the supply image from the first image supply device 100a is selected as the projection object. FIG. 4B is a schematic diagram showing the display condition of the projection image on the projection screen SC. In the condition of the operation window 300 shown in FIG. 4A, the supply image from the first image supply device 100a is displayed by projection on the projection screen SC in the single image layout mode.

Figure 5A:
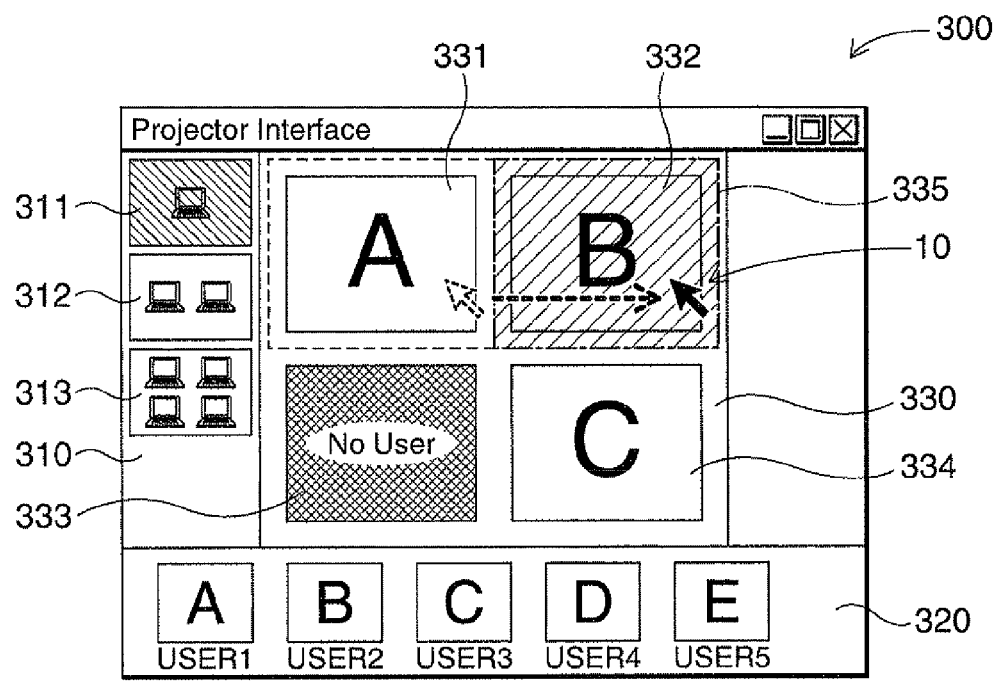
FIGS. 5A and 5B are schematic diagrams for explaining a move operation of an image selection frame in the operation window.
Figure 5B:
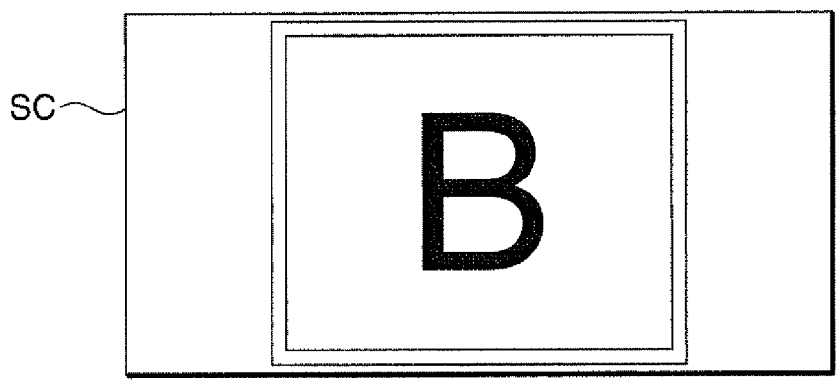

FIGS. 5A and 5B are schematic diagrams for explaining a move operation of the image selection frame 335 in the operation window 300. FIG. 5A is substantially the same as FIG. 4A except the point that the display position of the image selection frame 335 is different, and the point that the drag operation with a pointer 10 is shown schematically. FIG. 5B is substantially the same as FIG. 4B except the point that the supply image displayed on the projection screen SC is different. In the operation window 300, each user can move the position of the image selection frame 335 toward the direction of the drag operation by performing the drag operation designating the display area inside the peripheral frame of the image selection frame 335 using the pointer 10.

FIG. 5A schematically shows the condition in which the image selection frame 335 having been displayed on the first thumbnail image area 331 is moved to the position on the second thumbnail image area 332 due to the drag operation. By moving the display position of the image selection frame 335 in such a manner as described above, the supply image to be the projection object is set to the supply image represented by the thumbnail image displayed in the second thumbnail image area 332 (FIG. 5B).

The image selection frame 335 can arbitrarily be moved to the position on either of the thumbnail image areas 331 through 334 by the similar drag operation of each of the users using the pointer 10. Further, the display content of the projection screen SC is changed in accordance with the move position of the image selection frame 335. It should be noted that if the image selection frame 335 is moved to the third thumbnail image area 333 where "No User" shown in FIG. 5A is displayed, the projection screen SC becomes in the condition of nondisplay.

Here, as described above, the image display system 1000 has the three layout modes, and the number of supply images displayed on the projection screen SC is different between the layout modes. In FIGS. 4A, 4B, 5A, and 5B, the operation of the image selection frame 335 in the single image layout mode is explained. In the operation window 300, it is possible to perform the operation of changing the shape of the image selection frame 335 to increase or decrease the number of thumbnail images included in the image selection frame 335, thereby executing the change of the layout mode. Specifically, the layout change operation can be performed in such a manner as described below.

Figure 6A:
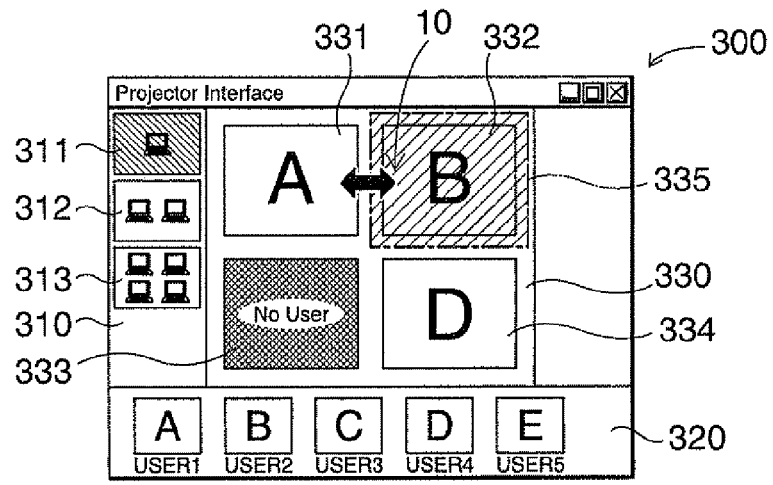
FIGS. 6A through 6C are schematic diagrams for explaining a change operation of a layout mode in the operation window.
Figure 6B:
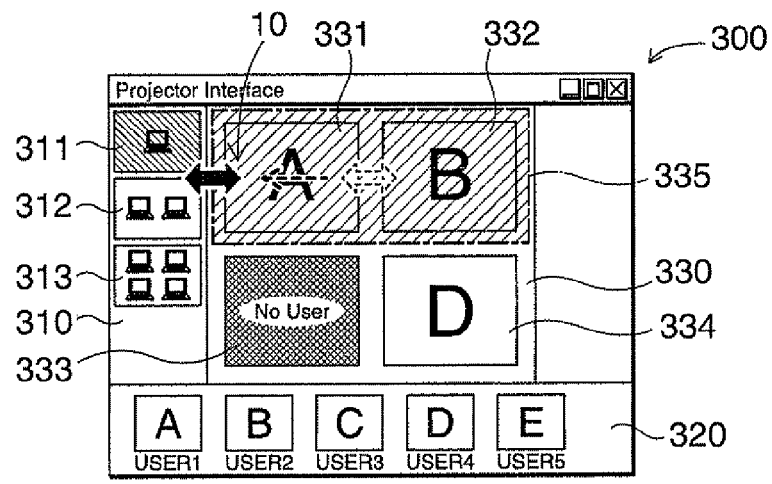
Figure 6C:
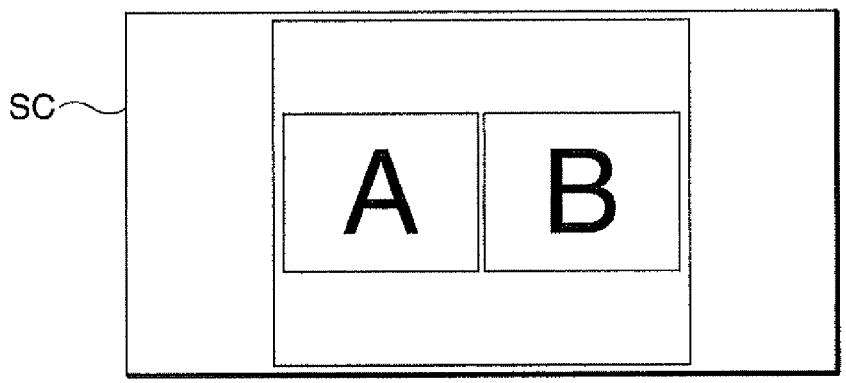

FIGS. 6A through 6C are schematic diagrams for explaining the change operation of the layout mode in the operation window 300, and show the switching operation between the single image layout mode and the dual split layout mode in a phased manner. FIG. 6A is substantially the same as FIG. 5A except the point that the shape of the pointer 10 is changed. In the operation window 300, if the pointer 10 is moved to the peripheral frame of the image selection frame 335, the shape of the pointer 10 changes to show the user the fact that the drag operation of the peripheral frame is possible. In FIG. 6A, the pointer 10 has an arrow shape indicating the lateral direction on the display screen. This denotes that it is possible to drag the peripheral frame of the image selection frame 335 located under the pointer 10 in the directions indicated accordingly.

FIG. 6B shows the condition in which the shape of the image selection frame 335 is varied by dragging the peripheral frame of the image selection frame 335 toward the left side of the screen. Due to the drag operation with the pointer 10, the image selection frame 335 is changed to have a landscape rectangular shape straddling the first and second thumbnail image areas 331, 332. In other words, the supply images to be the projection object become the thumbnail images displayed in these two thumbnail image areas 331, 332, and the layout mode is switched from the single image layout mode to the dual split layout mode. FIG. 6C shows the display condition of the image on the projection screen SC after the layout mode has been changed. The two supply images selected by the image selection frame 335 are displayed on the projection screen SC in the split layout in which the two supply images are arranged in parallel in the lateral direction on the screen.

It should be noted that it is also possible to switch the dual split layout mode to the single image layout mode by performing the drag operation reverse to the drag operation explained with reference to FIGS. 6A and 6B on the peripheral frame of the image selection frame 335. Further, in the condition of the operation window 300 shown in FIG. 6B, the image selection frame 335 can be moved in the vertical direction in the display candidate image list area 330 by the drag operation of the pointer 10 explained with reference to FIGS. 5A and 5B. According to this operation, the projection object in the dual split layout mode is changed.

Figure 7A:
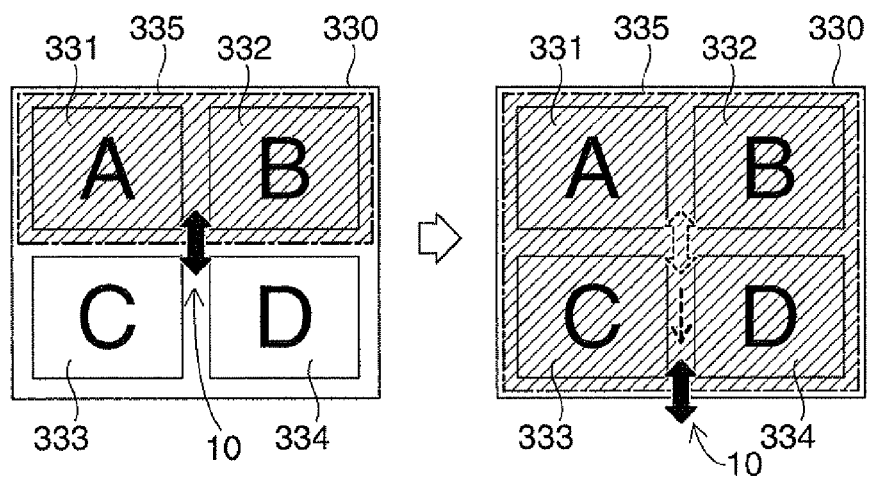
FIGS. 7A through 7C are schematic diagrams for explaining another change operation of the layout mode in the operation window.
Figure 7B:
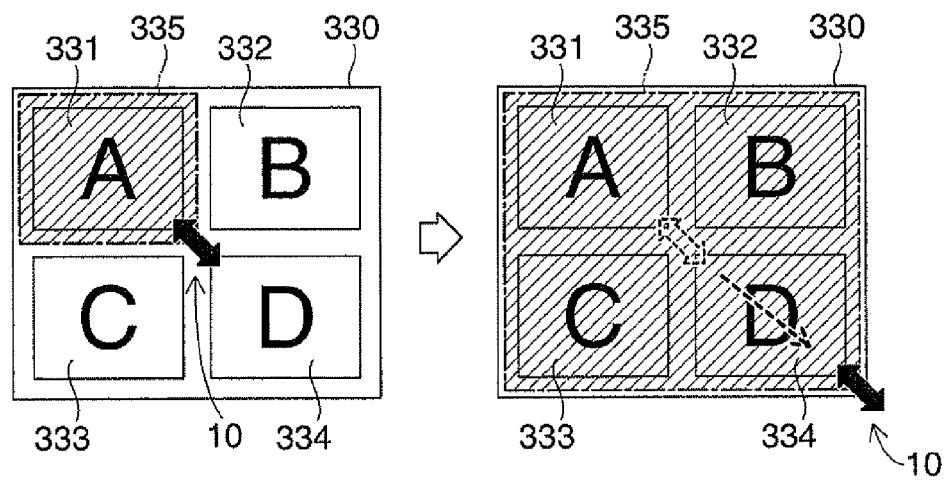
Figure 7C:
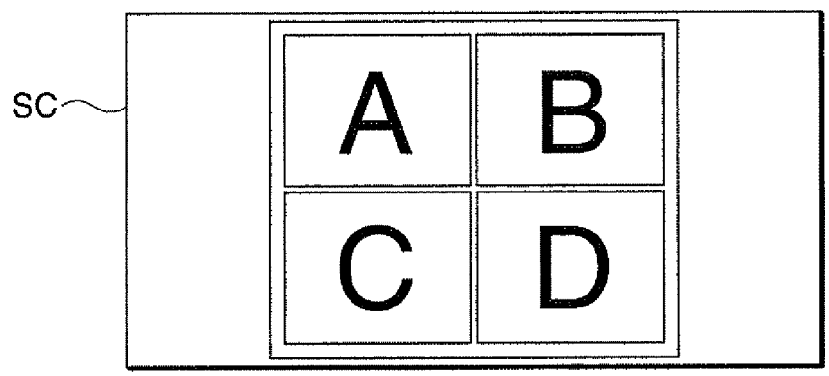

FIGS. 7A through 7C are schematic diagrams for explaining another change operation of the layout mode in the operation window 300. FIGS. 7A and 7B are screen transition diagrams respectively showing the change operations of the layout mode different from each other. FIG. 7C is a schematic diagram showing the display images on the projection screen SC after the operations respectively explained with reference to FIGS. 7A and 7B. It should be noted that FIGS. 7A and 7B show only the display candidate image list area 330 out of the operation window 300 and illustration of the other display areas is omitted for the sake of convenience of explanation.

FIG. 7A shows the layout mode change operation from the dual split layout mode to the quad split layout mode. In the case in which the image selection frame 335 has the landscape shape explained with reference to FIGS. 6A and 6B, the peripheral frame corresponding to the bottom of the shape is dragged downward in the screen with the pointer 10. Then, the shape of the image selection frame 335 is enlarged to cover the four thumbnail image areas 331 through 334. Thus, the display image on the projection screen SC is switched to the quad split layout mode, and the four supply images registered as the display candidate images are arranged on the display screen in the split layout with the 2×2 matrix layout configuration (FIG. 7C).

It should be noted that even in the case in which the image selection frame 335 is located on the third and fourth thumbnail image areas 333, 334 in the dual split layout mode, the switch to the quad split layout mode is possible in substantially the same way. Specifically, in this case, the peripheral frame corresponding to the upper side of the image selection frame 335 is designated and then dragged upward in the screen. Further, by performing the drag operation reverse to the above on the image selection frame 335 in the quad split layout mode, the switch to the dual split layout mode can be performed.

FIG. 7B shows the layout mode change operation from the single image layout mode to the quad split layout mode. In the case in which the image selection frame 335 in the single layout mode is located on the first thumbnail image area 331, the pointer 10 is disposed on the corner of the image selection frame 335 located at the center of the display candidate image list area 330. In this case, the shape of the pointer 10 changes as shown in the drawing. In this condition, the corner section is dragged obliquely downward in the screen. By this drag operation, the image selection frame 335 is enlarged in the four sides so as to cover the first through fourth thumbnail image areas 331 through 334. Then, the layout mode of the display image on the projection screen SC is switched to the quad split layout mode (FIG. 7C).

It should be noted that even in the case in which the image selection frame 335 in the single image layout mode is located in either one of the second through fourth thumbnail image areas 332 through 334, the switch to the quad split layout mode is possible by the drag operation on the corner section in the similar manner. Further, by performing the drag operation reverse to the above on the corner section of the image selection frame 335 in the quad split layout mode, the switch from the quad split layout mode to the single image layout mode can be performed.

Figure 8A:
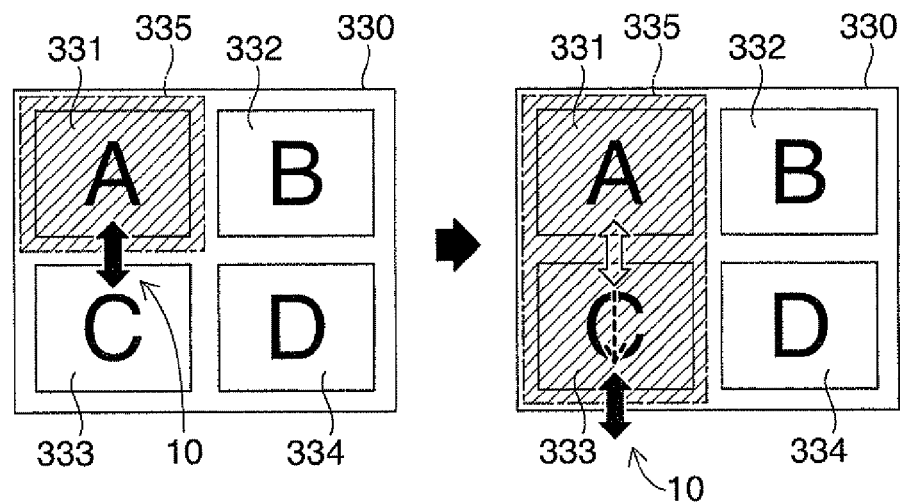
FIGS. 8A and 8B are schematic diagrams for explaining another operation example in a display candidate image list area.
Figure 8B:
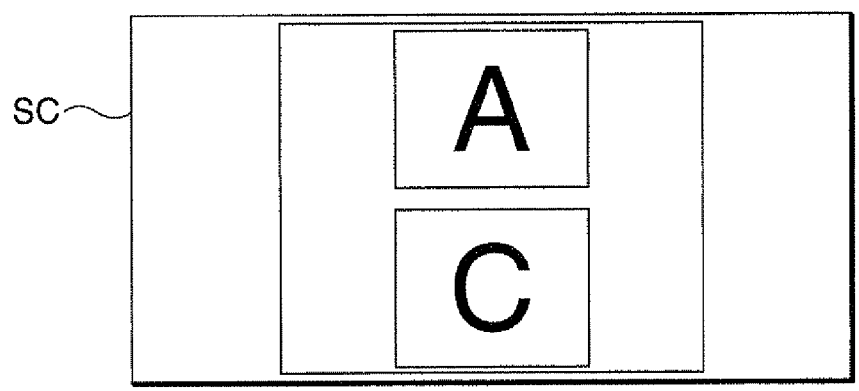

FIGS. 8A, 8B, 9A, and 9B are schematic diagrams for explaining other operation examples in the display candidate image list area 330. FIGS. 8A and 8B are schematic diagrams for explaining the change operation from the single image layout mode to the dual split layout mode different from the change operation shown in FIGS. 6A and 6B. FIG. 8A is a screen transition diagram showing only the display candidate image list area 330 similar to FIGS. 7A and 7B. Further, FIG. 8B is a schematic diagram showing the display condition of the display image on the projection screen SC.

Here, in FIGS. 6A and 6B, by changing the image selection frame 335 in the single image layout mode to have the landscape rectangular shape, the display image is changed to the dual split layout mode in which the supply images are arranged in parallel in the lateral direction. However, in the image display system 1000, it is also possible to change the display image to the dual split layout mode as described below.

FIG. 8A shows the condition in which the image selection frame 335 in the single image layout mode is located in the first thumbnail image area 331 of the display candidate image list area 330 as an example. In this condition, the drag operation is performed on the peripheral frame corresponding to the bottom of the image selection frame 335 with the pointer 10. Then, the shape of the image selection frame 335 changes to the portrait rectangular shape straddling the first and third thumbnail image areas 331, 333. Thus, the layout mode in the display image of the projection screen SC is switched to the dual split layout mode. It should be noted that in the case of the present operation, the two supply images selected as the projection display object are displayed in the split layout arranged in parallel in the vertical direction (FIG. 8B).

The change operation to the dual split layout mode can be performed in a similar manner even in the case in which the image selection frame 335 in the single image layout mode is located in either one of the second through fourth thumbnail image areas 332 through 334. Further, this change operation to the dual split layout mode can be performed by the drag operation of shrinking the image selection frame 335 to have the portrait rectangular shape even in the condition in which the quad split layout mode is selected. It should be noted that it is possible to assume that even in the case in which the operation for changing the image selection frame 335 to have the portrait rectangular shape is performed, the display in the dual split mode in which the two supply images are arranged in the split layout in parallel in the lateral direction in the screen as explained with reference to FIG. 6C.

Incidentally, as can be understood from the explanation described hereinabove, the image selection frame 335 is displayed only in either one of the two or more display patterns set previously. Specifically, as the display patterns of the image selection frame 335, there are set the display patterns different from each other in at least one of the display position in the display candidate image list area 330 and the number of thumbnail images displayed in the frame. Further, the image selection frame 335 changes from one of the two or more display patterns to another of the display patterns in accordance with the single drag operation by the user. As described above, in the image display system 1000 according to the present embodiment, it is arranged that the position and the shape of the image selection frame 335 can be changed with a single drag operation, and therefore, the change of the supply image as the display object and the designation of the layout mode are possible with the single drag operation.

Figure 9A:
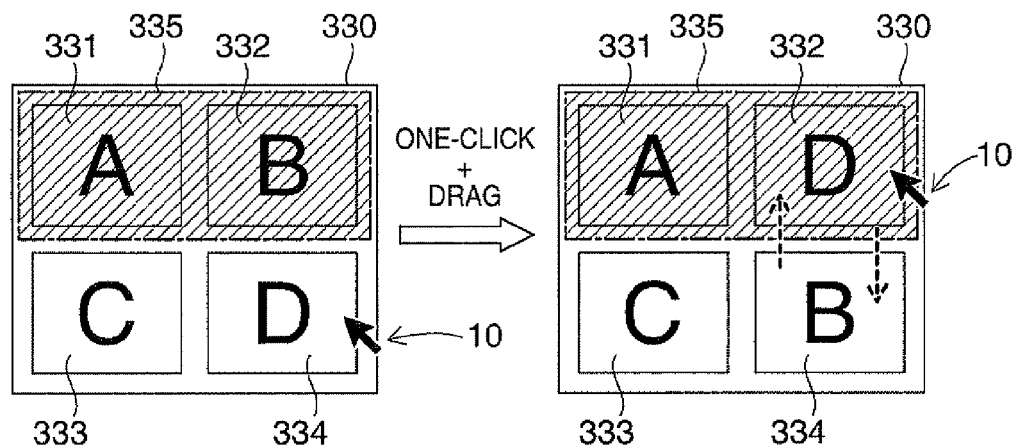
FIGS. 9A and 9B are schematic diagrams for explaining another operation example in a display candidate image list area.
Figure 9B:
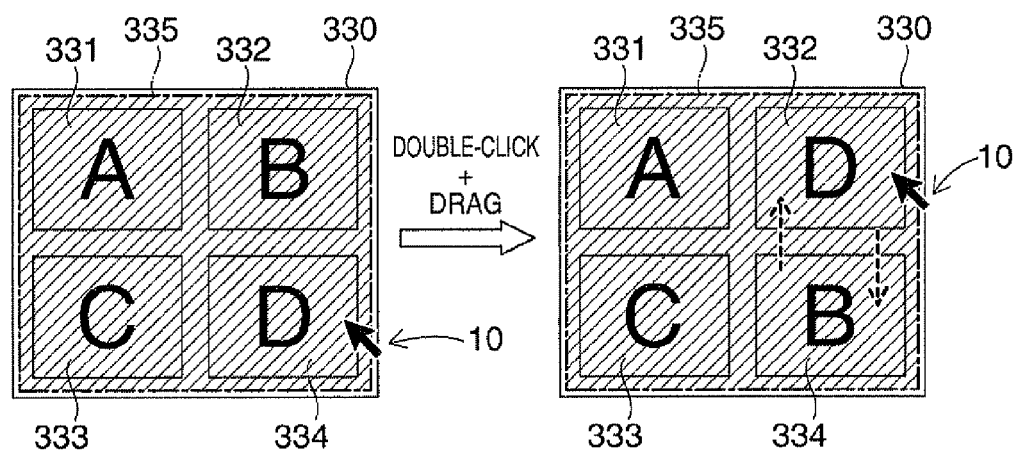

FIGS. 9A and 9B are screen transition diagrams for explaining the change operation of the layout position of the thumbnail images in the display candidate image list area 330. FIGS. 9A and 9B show only the screen transition of the display candidate image list area 330 similar to FIG. 8A. In the operation window 300, by dragging and dropping the thumbnail image displayed in the display candidate image list area 330 to the position where another thumbnail image is displayed, the display positions of these thumbnail images can be interchanged with each other (FIG. 9A). According to this operation, it becomes possible to change the supply image to be the projection object to the projection screen SC without using the drag operation on the image selection frame 335.

Here, the case in which the drag operation for changing the layout position described above is performed on the thumbnail image in the peripheral frame of the image selection frame 335 is assumed (FIG. 9B). In this case, there is a possibility that the discrimination whether the target object of the drag operation is the image selection frame 335 or the thumbnail image becomes difficult. Therefore, in the operation window 300 according to the present embodiment, the method of designating the target object of the operation in the drag operation to the thumbnail image displayed in the image selection frame 335 is made different from the designation method in the drag operation to the image selection frame 335.

Specifically, in the case of performing the drag operation on the image selection frame 335, the mouse operation for the drag operation is assumed to be the operation of holding down the button of the mouse once (one click), and then moving the mouse. In contrast, in the case of performing the drag operation on the thumbnail image in the image selection frame 335, the mouse operation for the drag operation is assumed to be the operation of holding down the button of the mouse twice (double click), and then moving the mouse. Thus, even in the case in which the image selection frame 335 and the thumbnail image are displayed so as to overlap with each other, it becomes possible to surely distinguish the drag operations for the respective constituents from each other to thereby perform the drag operations.

As described above, according to the image display system 1000 of the present embodiment, the operability (usability) for the user is improved due to the operation window 300. Further, according to the image display system 1000 of the present embodiment, the operation windows 300 with the display contents in sync with each other are displayed in the display sections 160 of the respective image supply devices 100a through 100e. Therefore, the users of the respective image supply devices 100a through 100e can perform the operation on the display image of the projection screen SC on equal footing. Therefore, by using this image display system 1000, it becomes possible to more efficiently operate conferences and presentations in which a number of participants make arguments and give papers using images.

B. Second Embodiment

Figure 10:
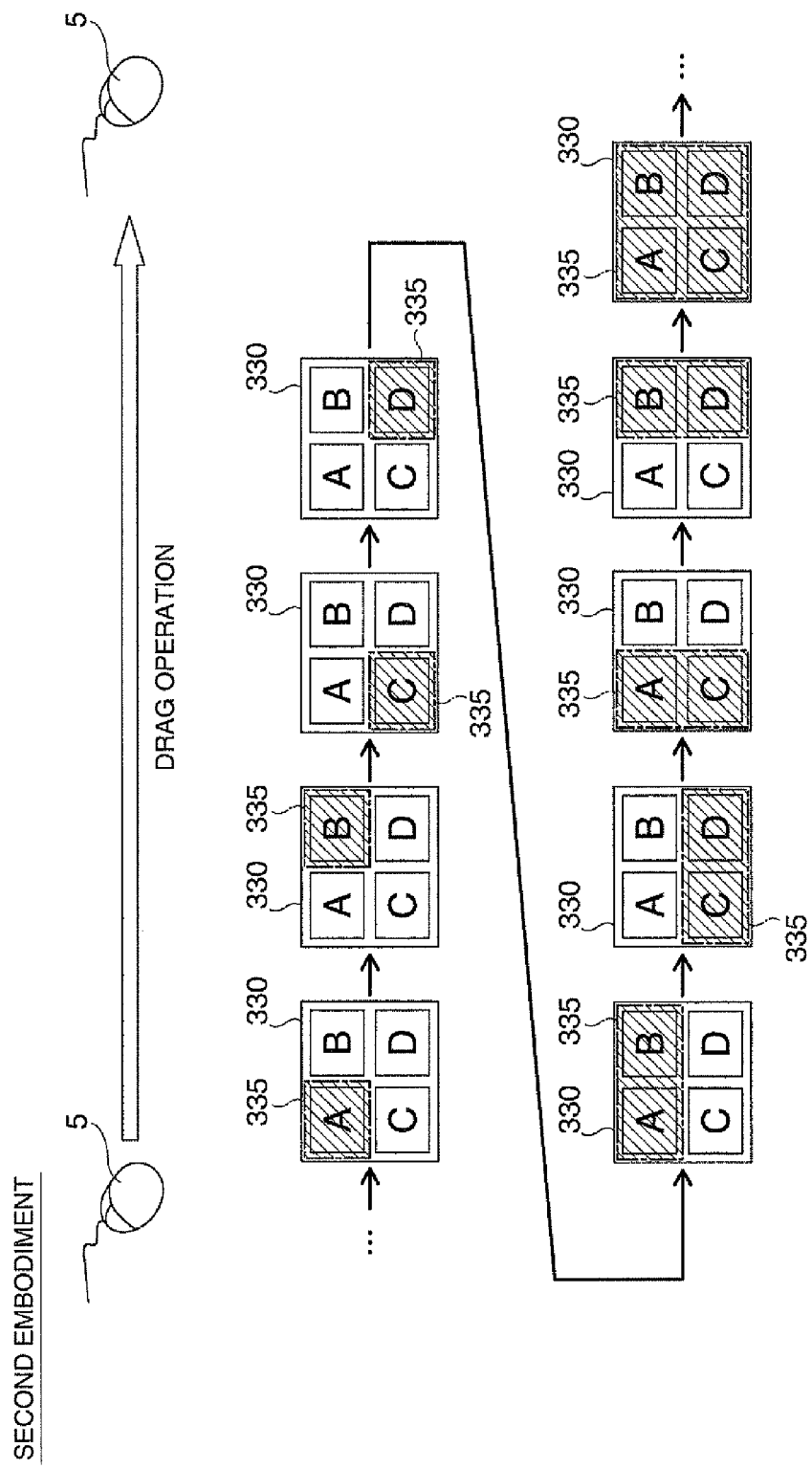
FIG. 10 is a schematic diagram for explaining an operation to the operation window in a second embodiment.

FIG. 10 is a schematic diagram for explaining an operation to the operation window in the image display system as a second embodiment of the invention. FIG. 10 shows a diagram schematically showing the drag operation of the mouse 5 as an input device and the transition diagram of the display pattern of the image selection frame 335 in the display candidate image list area 330 in parallel to each other. The image display according to the second embodiment is the same as the image display system 1000 explained as the first embodiment except the point that the manner of operation of the user to the image selection frame 335 is different.

The mouse 5 is installed to each of the image supply devices 100a through 100e. Each of the users can operate the pointer 10 with the mouse 5, and is therefore capable of performing the drag operation to the operation window 300. Here, in the image display system according to the second embodiment, when performing the drag operation with the mouse 5 designating the display area in the image selection frame 335, the display pattern of the image selection frame 335 varies in a cyclic manner in accordance with the distance of the movement of the mouse 5 due to the drag operation. These display patterns of the image selection frame 335 are the same as the display patterns explained in the first embodiment, and are the display patterns different from each at least one of the display position in the display candidate image list area 330 and the number of thumbnail images displayed in the frame. It should be noted that in the case in which the mouse 5 is a so-called wheel mouse, it is also possible to arrange that the display pattern of the image selection frame 335 can be varied in a cyclic manner in accordance with the amount of rotation of the wheel.

As described above, according to the image display system of the second embodiment, the supply image as the display object can be changed or the layout mode can be switched by the single drag operation of the user to the display candidate image list area 330 of the operation window 300 similarly to the first embodiment. It should be noted that in the image display system 1000 according to the first embodiment the drag operation for moving the image selection frame 335 and the drag operation for changing the shape are distinguished based on the difference in the display area designated by the pointer 10, and then received. Further, in the first embodiment, the movement of the image selection frame 335 is performed in accordance with the direction of the drag operation, and the change of the shape is performed by moving the peripheral frame in accordance with the direction of the drag operation. In other words, it can be said that the user can operate the image selection frame 335 more intuitively in the image display system 1000 according to the first embodiment.

C. MODIFIED EXAMPLES

It should be noted that the invention is not limited to the specific examples and the embodiments described above, but can be put into practice in various forms within the scope or the spirit of the invention, and the following modifications, for example, are also possible.

C1. First Modified Example

In the embodiment described above, it is possible to replace a part of the configuration realized by hardware with software, or to replace a part of the configuration realized by software with hardware. Further, for example, it is also possible to arrange that a part of the function of the user interface module M4 is performed by another module.

C2. Second Modified Example

In the embodiments described above, the five image supply devices 100a through 100e are connected to the image display device 200. However, it is also possible to arrange that a plurality of image supply devices is additionally connected to the image display device 200.

C3. Third Modified Example

In the embodiments described above, the image supply devices 100a though 100e are each composed of an information processing device. However, the image supply devices 100a through 100e are not necessary required to be the information processing devices, but it is sufficient for the image supply devices to be a device capable of generating an image signal and transmitting the image signal to the outside. For example, it is also possible to arrange that the image supply devices are each an image reproduction device such as a video player or a DVD player.

C4. Fourth Modified Example

In the embodiments described above, the image display device 200 is composed of a projector for displaying an image on the projection screen SC by projection. However, the image display device 200 can also be arranged to be composed of a device for forming the display image by another method. For example, the image display device 200 can be arranged to be composed of a liquid crystal television or a plasma television.

C5. Fifth Modified Example

In the embodiments described above, the operation window 300 includes the layout mode display area 310 and the login user list area 320. However, it is also possible to arrange that the layout mode display area 310 and the login user list area 320 are omitted. If the login user area 320 is omitted, it is also possible to arrange that it is registered to the display candidate image list area 330 as the display candidate image in the order of establishment of the connection with the image display device 200.

C6. Sixth Modified Example

In the embodiments described above, the thumbnail images representing the contents of the supply images are displayed in the login user list area 320 and the display candidate image list area 330 of the operation window 300. However, it is also possible to arrange that other images are displayed in these list areas 320, 330 instead of the thumbnail images of the supply images. In other words, it is sufficient that the identification images for allowing the user to identify the supply images are displayed on these list areas 320, 330. As such identification images, there are included, for example, the images with different display colors between the supply images, the icons set for the respective supply images, and the images of the character string representing the respective image names of the supply images.

C7. Seventh Modified Example

In the embodiments described above, the same number of thumbnail images as the largest number of images, which can be arranged in the display image of the projection screen SC in the split layout, can be displayed in the display candidate image list area 330 of the operation window 300. However, it is also possible to arrange that the larger number of thumbnail images than the number of images, which can be arranged in the display image in the split layout, can be displayed in the display candidate image list area 330.

C8. Eighth Modified Example

In the embodiments described above, the disposition layout of the thumbnail images in the display candidate image list area 330 and the disposition layout of the supply images in the display image in the quad split layout mode correspond to each other. However, these disposition layouts are not necessarily required to correspond to each other. Specifically, it is also possible to arrange that the thumbnail images are arranged in a line in the lateral direction on the screen in the display candidate image list area 330 while the supply images are arranged in the 2×2 matrix arrangement configuration in the display image. It should be noted that in the case in which the disposition layout of the supply images in the display image and the disposition layout of the thumbnail images in the display candidate image list area 330 are in sync with each other, the convenience of the user in performing the layout change operation of the images is more enhanced.

C9. Ninth Modified Example

In the embodiments described above, the display image by the image display system 1000 has the layout mode in which the maximum of four supply images can be displayed. However, it is also possible to arrange that a plurality of supply images can additionally be disposed in the split layout in the display image of the image display system 1000.

C10. Tenth Modified Example

In the image display system 1000 according to the embodiments described above, the update information generation module M25 of the image display device 200 functions as a server for generating and then delivering the update information of the operation window 300. However, the update information of the operation window 300 need not be delivered by the image display device 200. For example, it is possible to arrange that the image supply device first connected to the image display device 200 functions as the server, and delivers the update information for synchronizing the operation window 300 of the image display device 200 to other image supply devices. Alternatively, it is also possible to arrange that the image supply device having received the operation of the user via the operation window 300 delivers the update information of the operation window 300 to other image supply devices.

C11. Eleventh Modified Example

In the embodiments described above, the operation window 300 is displayed on the display section 160 of each of the image supply devices 100a through 100e. However, the operation window 300 is not necessarily required to be displayed on all of the image supply devices 100a through 100e connected to the image display device 200. Further, it is also possible to arrange that the operation window 300 is displayed on a display section provided to the image display device 200. It should be noted that it is possible to recognize that in the embodiments described above the display sections 160 and the input devices of the image supply devices 100a through 100e, the update information generation module M25 and the communication control module M26, further the user interface module M4 and the communication control module M3 of the image display device 200, and so on cooperate with each other to thereby function as the operation input device for receiving the operations from the users.

C12. Twelfth Modified Example

In the operation window 300 of the first embodiment described above, when the drag operation designating the area in the image selection frame 335 is received, the image selection frame 335 is moved, and when the drag operation designating the peripheral frame (the area shaped like a frame) is received, the shape of the image selection frame 335 is changed. However, it is also possible to arrange that the operation window 300 receives the drag operation designating other areas as an operation for moving the image selection frame 335 or for changing the shape of the image selection frame 335. For example, it is also possible to arrange that in the operation window 300, the shape of the image selection frame 335 is changed when the drag operation designating the center portion of each of the sides constituting the peripheral frame of the image selection frame 335 is performed. Further, it is also possible to arrange that the image selection frame 335 is moved in response only to the drag operation designating the specific position in the image selection frame 335.

C13. Thirteenth Modified Example

In the embodiments described above, the operation window 300 is operated using the pointer 10 displayed on the display section 160 of each of the image supply devices 100a through 100e. However, it is also possible to arrange that the operation window 300 can be operated by other measures. For example, it is also possible to arrange that the operation window 300 is displayed on a touch panel, and the user performs the drag operation to the image selection frame 335 using the own fingers.

C14. Fourteenth Modified Example

In the embodiments described above, the image selection frame 335 can take only two or more display patterns, which have been set previously and are different from each other in at least one of the display position in the display candidate image list area 320 and the number of thumbnail images displayed in the frame. Further, the user is allowed to change the display pattern thereof by a single drag operation to thereby select the image to be displayed and to designate the layout thereof. However, it is also possible to arrange that the image selection frame 335 can take predetermined display patterns different from each other in the display position in the display candidate image list area 320 or the number of thumbnail images displayed in the frame. Alternatively, it is also possible to arrange that the image selection frame 335 can take display patterns other than the predetermined display patterns. Further, it is also possible to arrange that the user is allowed to change the display pattern of the image selection frame 335 by a plurality of number of times of drag operation, the combination of the single drag operation and another operation with each other, or other operations. It should be noted that since the user can give instruction on the selection of the image to be the display object and on the designation of the layout of the display image with the minimum operations according to the configuration of the embodiment described above, the usability in the image display system can further be improved.

What is claimed is:
1. An image display system comprising:
a plurality of image supply devices; and
an image display device adapted to display one or more supply images out of supply images supplied from the respective image supply devices,
wherein each of the image supply devices includes
a display section, and
an interface section adapted to display an operating image on the display section, the operating image being used for selecting at least one of the supply images to be displayed by the image display device and designating a layout of the supply images selected, and to transmit an instruction by a user via the operating image to the image supply devices,
the interface section displays the operating image on the display section, the operating image including a candidate image display area adapted to arrange and display identification images representing candidate images to be display candidates out of the supply images, and a selection frame used for selecting and arranging at least one of the candidate images to be actually displayed by the image display device out of one or more of the identification images displayed in the candidate image display area, and displays the selection frame so as to take either one of two or more display patterns set previously and different from each other in one of a display position in the candidate image display area and a number of candidate images included in the selection frame, and to change from one display pattern to another display pattern out of the two or more display patterns in accordance with an operation by the user.
2. The image display system according to claim 1, wherein the operation is a drag operation including a first operation performed while designating an image area in the selection frame with a pointer, and a second operation performed while designating a position on the selection frame, and
the interface section changes the selection frame to the display pattern with a different display position when receiving the first operation, and changes the selection frame to the display pattern with the different number of candidate images included in the selection frame when receiving the second operation.
3. The image display system according to claim 1, wherein the number of the identification images displayed in the candidate image display area is equal to the number of the supply images, which can be arranged in the display image by the image display device.

4. The image display system according to claim 1, wherein a part of the candidate image display area where no identification image is disposed is indicated in a visible manner.

5. The image display system according to claim 1, wherein the image display device includes an interface section adapted to make the display section of each of the image supply devices display an operating image, the operating image being used for selecting at least one of the supply images to be displayed and designating a layout of the supply images selected, and to receive the instruction by a user via the operating image from the image supply devices, and the interface section makes the display section display the operating image including the candidate image display area adapted to arrange and display identification images representing the candidate images to be the display candidates out of the supply images, and the selection frame used for selecting and arranging at least one of the candidate images to be actually displayed by the image display device out of the one or more of the identification images displayed in the candidate image display area, and makes the display section display the selection frame so as to take either one of the two or more display patterns set previously and different from each other in one of a display position in the candidate image display area and a number of candidate images included in the selection frame, and to change from one display pattern to another display pattern out of the two or more display patterns in accordance with an operation by the user.

6. A graphical user interface to be displayed on a display section of each of image supply devices in order for selecting one or more supply images out of supply images supplied from the respective image supply devices, and displaying the selected supply image on an image display device, the graphical user interface comprising:

a candidate image display area adapted to arrange and display identification images representing the respective candidate images to be display candidates out of the supply images; and a selection frame used for selecting and arranging at least one of the candidate images actually displayed by the image display device out of one or more of the identification images displayed in the candidate image display area, wherein the selection frame takes either one of two or more display patterns set previously and different from each other in one of a display position in the candidate image display area and a number of candidate images included in the selection frame, and changes from one display pattern to another display pattern out of the two or more display patterns in accordance with an operation by the user.

7. The graphical user interface according to claim 6, wherein the drag operation includes a first operation performed while designating an image area in the selection frame with a pointer, and a second operation performed while designating a position on the selection frame, and the selection frame is changed to the display pattern with a different display position when receiving the first operation, and the selection frame is changed to the display pattern with the different number of candidate images included in the selection frame when receiving the second operation.

8. The graphical user interface according to claim 6, wherein the number of the identification images displayed in the candidate image display area is equal to the number of the supply images, which can be arranged in the display image by the image display device.

9. The graphical user interface according to claim 6, wherein a part of the candidate image display area where no identification image is disposed is indicated in a visible manner.

10. An image display method in an image display system, comprising:

(a) providing a plurality of image supply devices each having a display section, and an image display device adapted to display one or more supply images out of supply images supplied from the respective image supply devices;

(b) displaying, in the image supply device, an operating image on the display section, the operating image being used for selecting at least one of the supply images to be displayed by the image display device and designating a layout of the supply images selected;

(c) arranging and displaying, in the image supply device, identification images representing candidate images to be display candidates out of the supply images in a candidate image display area previously provided in the operating image, and displaying a selection frame used for selecting and arranging at least one of the candidate images to be actually displayed by the image display device out of one or more of the identification images displayed in the candidate image display area;

(d) displaying, in the image supply device, the selection frame so as to take either one of two or more display patterns set previously and different from each other in one of a display position in the candidate image display area and a number of candidate images included in the selection frame, and to change from one display pattern to another display pattern out of the two or more display patterns in accordance with an operation by the user;

(e) transmitting, in the image supply device, an instruction by the user via the operating image to the image display device; and (f) displaying, in the image supply device, the supply images selected in the designated layout in response to the instruction by the user received.

11. The image display method according to claim 10, wherein in the image supply device, (g) the operation includes a first operation performed while designating an image area in the selection frame with a pointer, and a second operation performed while designating a position on the selection frame, and (h) the selection frame is changed to the display pattern with a different display position when receiving the first operation, and the selection frame is changed to the display pattern with the different number of candidate images included in the selection frame when receiving the second operation.

12. The image display method according to claim 10, further comprising:

(i) displaying, in the image supply device, at least one of the identification images so that the number of the identification images displayed in the candidate image display area is equal to the number of the supply images, which can be arranged in the display image by the image display device.

13. The image display method according to claim 10, further comprising:
(j) indicating, in the image supply device, a part of the candidate image display area where no identification image is disposed in a visible manner.

14. A graphical user interface to be displayed on a display section of an image supply device in order for selecting one or more supply images out of supply images supplied from another image supply device, and displaying the selected supply image on the image display device, the graphical user interface comprising:
a candidate image display area adapted to arrange and display identification images representing the respective candidate images to be displayed; and
a selection frame used for selecting and arranging at least one of the candidate images actually displayed by the image display device out of one or more of the identification images displayed in the candidate image display area,
wherein the selection frame has a plurality of display patterns set previously, and the display pattern is changed from one display pattern to another display pattern in accordance with an operation by the user.

15. The graphical user interface according to claim 14, further comprising:
a drag operation including a first operation designating an image area in the selection frame with a pointer, and a second operation designating a position on the selection frame with a pointer, and
the selection frame being changed to the display pattern with a different display position when receiving the first operation, and the selection frame being changed to the display pattern with the different number of candidate images included in the selection frame when receiving the second operation.

16. The graphical user interface according to claim 14, wherein
the number of the identification images displayed in the candidate image display area is equal to the number of the supply images, which can be arranged in the display image by the image display device.

17. The graphical user interface according to claim 14, wherein
a part of the candidate image display area where no identification image is disposed is indicated in a visible manner.

* * * * *